US011353594B2

(12) United States Patent
Kaufmann

(10) Patent No.: US 11,353,594 B2
(45) Date of Patent: Jun. 7, 2022

(54) METHODS AND APPARATUS FOR DETECTING A POTENTIAL FAULT IN A POSITIONING DEVICE

(71) Applicant: u-blox AG, Thalwil (CH)

(72) Inventor: Thomas Kaufmann, Zurich (CH)

(73) Assignee: u-blox AG, Thalwil (CH)

( * ) Notice: Subject to any disclaimer, the term of this patent is extended or adjusted under 35 U.S.C. 154(b) by 32 days.

(21) Appl. No.: 16/927,284

(22) Filed: Jul. 13, 2020

(65) Prior Publication Data

US 2022/0011441 A1 Jan. 13, 2022

(51) Int. Cl.
*G01S 19/20* (2010.01)
*G01S 19/23* (2010.01)
*G01S 19/42* (2010.01)

(52) U.S. Cl.
CPC .............. *G01S 19/20* (2013.01); *G01S 19/23* (2013.01); *G01S 19/42* (2013.01)

(58) Field of Classification Search
CPC ................................ G01S 19/20; G01S 19/23
USPC ...................................................... 342/357.58
See application file for complete search history.

(56) References Cited

U.S. PATENT DOCUMENTS

| 8,688,065 | B2 * | 4/2014 | Young | H04B 17/336 |
| | | | | 455/226.1 |
| 9,113,291 | B2 * | 8/2015 | Venkatraman | G01S 5/0278 |
| 2004/0071237 | A1 * | 4/2004 | Wakimoto | H03G 3/3078 |
| | | | | 375/345 |
| 2020/0341153 | A1 * | 10/2020 | Orejas | G01S 19/40 |
| 2021/0089572 | A1 * | 3/2021 | Lawlor | G06K 9/0063 |
| 2021/0276577 | A1 * | 9/2021 | Adams | B60W 50/0205 |

FOREIGN PATENT DOCUMENTS

| CN | 101936767 A | * | 1/2011 |
| CN | 105007109 A | * | 10/2015 |

OTHER PUBLICATIONS

Ndili, Awele et al., "GPS Receiver Autonomous Interference Detection", 1998 IEEE Position, Location and Navigation Symposium—PLANS '98, Palm Springs, CA, USA, Apr. 1998 (8 pgs.).
Ochieng, Washington Y. et al., "GPS Integrity and Potential Impact on Aviation Safety", The Journal of Navigation (2003), 56, pp. 51-65, DOI: 10.1017/S037346330200209 (15 pgs. ).

* cited by examiner

*Primary Examiner* — Harry K Liu
(74) *Attorney, Agent, or Firm* — Finnegan, Henderson, Farabow, Garrett & Dunner LLP

(57) ABSTRACT

Methods and apparatus for detecting a potential fault in a positioning device, the apparatus including at least one memory for storing instructions, and at least one controller configured to execute the instructions to perform operations including obtaining information about a received signal received by the positioning device, the information including at least one of a control parameter or an estimation of bias based on the received signal; determining whether the potential fault is detected, based on the information and a detection threshold; and in response to a determination that the potential fault is detected, generating an indication that the potential fault is detected.

12 Claims, 5 Drawing Sheets

METHODS AND APPARATUS FOR DETECTING A POTENTIAL FAULT IN A POSITIONING DEVICE

TECHNICAL FIELD

The present disclosure relates to fault detection for a positioning device, and more particularly, to methods and apparatus for detecting a potential fault in a positioning device.

BACKGROUND

Monitoring conditions of a receiver and a received signal for a positioning device enable providing accurate and reliable position information. External components and circuits of the receiver are expected to operate without a fault to support operations of the receiver in the positioning device. A catastrophic failure of an external circuit or component may be easily detected as a loss of the signal received by the receiver. However, the failure needs not be catastrophic. Even partial failure of components may be problematic and such partial failures in practice are difficult to detect. For instance, a fault may arise in any component connected to the receiver. For example, a fault may occur in a component of an impedance matching network. Alternatively, a component in a functional block, for example a surface acoustic wave (SAW) filter, may experience a fault, e.g., due to vibration, which may cause a distortion of the received signal by the receiver, but this signal may still potentially be processed and tracked by the receiver. Additionally, the receiver may still be able to receive new signals through the faulted SAW filter and attempt to compute a position based on the distorted signal received by the receiver. Nonetheless, the fault of the SAW filter on a radio frequency (RF) path may cause poor group delay characteristics of the newly received signals, which can cause severe changes in measurements and result in position errors. The position errors may cause non-compliance with a requirement for functional safety in some applications. For example, in functionally safe systems, a reported position of a positioning system should be trustworthy. The failure of components as described above would cause the reported position to be untrustworthy, and hence need to be detected and reported.

SUMMARY

Embodiments of the present application provide improved methods and apparatus for detecting a potential fault in a positioning device.

These embodiments include an apparatus for detecting a potential fault in a positioning device. The apparatus includes at least one memory for storing instructions, and at least one controller configured to execute the instructions to perform operations including obtaining information about a received signal received by the positioning device, the information comprising at least one of a control parameter or an estimation of bias based on the received signal; determining whether the potential fault is detected, based on the information and a detection threshold; and in response to a determination that the potential fault is detected, generating an indication that the potential fault is detected.

These embodiments also include a method for detecting a potential fault in a positioning device. The method includes obtaining information about a received signal received by the positioning device, the information comprising at least one of a control parameter or an estimation of bias based on the received signal in the positioning device; determining whether the potential fault is detected, based on the information and a detection threshold; and in response to a determination that the potential fault is detected, generating an indication that the potential fault is detected.

These embodiments further include a non-transitory computer-readable medium for storing instructions which, when executed, cause a controller to perform operations for detecting a potential fault in a positioning device. The operations including obtaining information about a received signal received by the positioning device, the information comprising at least one of a control parameter or an estimation of bias based on the received signal; determining whether the potential fault is detected, based on the information and a detection threshold; and in response to a determination that the potential fault is detected, generating an indication that the potential fault is detected.

DETAILED DESCRIPTION

Reference will now be made in detail to exemplary embodiments, examples of which are illustrated in the accompanying drawings. The following description refers to the accompanying drawings in which similar numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

A positioning device usually requires signals from four or more satellites in a positioning system to determine a position. For convenience of description, the positioning device is described herein as receiving a signal from the positioning system to determine the position.

Figure 1:
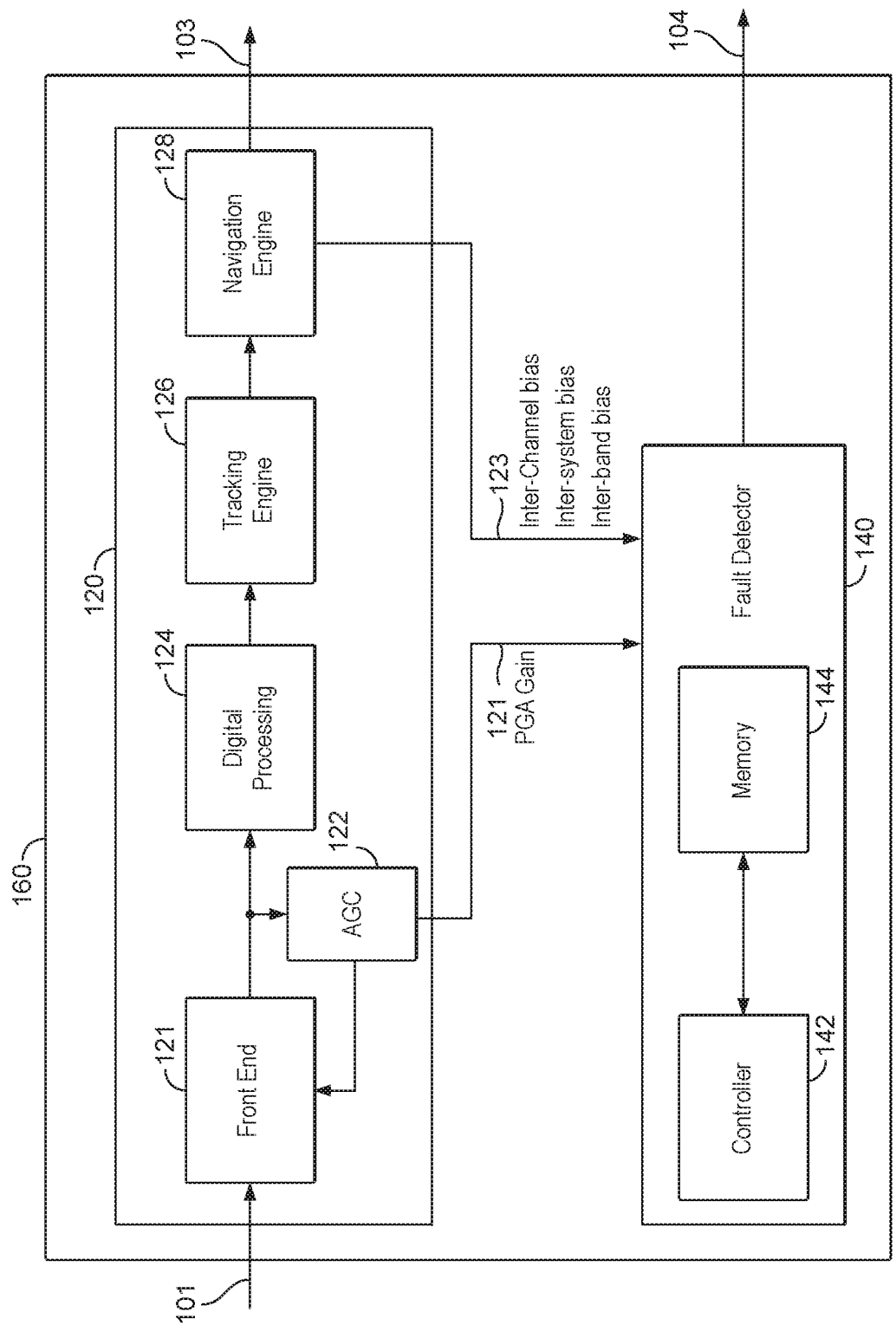
FIG. 1 is a block diagram of an exemplary fault detector and an exemplary receiver of a positioning device, consistent with embodiments of the present disclosure.

FIG. 1 is a block diagram of an exemplary fault detector 140 and an exemplary receiver 120 of a positioning device 160, consistent with embodiments of the present disclosure. As shown in FIG. 1, positioning device 160 includes receiver 120 and fault detector 140. Receiver 120 includes a front end 121, an automatic gain controller (AGC) 122, a digital processing circuit 124, a tracking engine 126, and a navigation engine 128. Fault detector 140 includes a controller 142 and a memory 144. One or more of these elements in FIG. 1 may be included for detecting a potential fault in positioning device 160. These elements may be configured to transfer data and send or receive instructions between or among each other.

In receiver 120, front end 121, digital processing circuit 124, tracking engine 126, and navigation engine 128 are coupled in cascade to receive a signal via an input 101, determine position and navigation information based on the received signal, and output navigation information via an output 103 to, for example, a user, a navigation user interface, a navigation device, or a server. AGC 122 is coupled to front end 121 to measure signal strength and control amplification gain of a programmable gain amplifier (PGA) in front end 121.

AGC 122 is configured to control a received signal strength at an input of digital processing circuit 124 such that a required signal-to-noise ratio (SNR) for proper analogue-to-digital conversion and digital processing is met. For example, if the received signal strength is weak, AGC 122 is configured to boost a gain for the received signal in order to minimize noise and bring a signal level of the received signal to an acceptable SNR. If the received signal strength is strong, e.g., because of the presence of interference, AGC 122 is configured to attenuate the gain for the received signal in order to avoid signal clipping and nonlinear distortion that may deteriorate the SNR of the received signal.

Digital processing circuit 124 is configured to receive and process a received digital signal. In some embodiments, digital processing circuit 124 includes a processor configured to execute instructions stored in a memory to receive and process the received digital signal. Digital processing circuit 124 is configured to filter, demodulate, and decode the received digital signal to obtain information transmitted from one or more satellites and send the information to tracking engine 126.

Tracking engine 126 is configured to track and decode received signals and perform pseudorange and phase measurements. In some embodiments, tracking engine 126 includes a processor configured to execute instructions stored in a memory to track and decode the received signals and perform the measurements.

Navigation engine 128 is configured to determine a position based on tracked signals, decoded information, and/or measurements from tracking engine 126. In some embodiments, navigation engine 128 includes a processor configured to execute instructions stored in a memory to determine a position based on the tracked signals, decoded information, and/or measurements. Navigation engine 128 is configured to output position information via output 103.

In some embodiments, digital processing circuit 124, tracking engine 126, and/or navigation engine 128 may be the same circuit or processor and memory configured to perform operations as described with reference to FIG. 1. For example, a processor and a memory can be configured to perform the described operations of digital processing circuit 124, tracking engine 126, and navigation engine 128. As another example, digital processing circuit 124 includes digital circuits for digital signal processing, and a processor and a memory are configured to perform the described operations of tracking engine 126 and navigation engine 128.

In fault detector 140, controller 142 is coupled to memory 144. Controller 142 includes any appropriate type of general-purpose or special-purpose microprocessor, digital signal processor, or microcontroller. After fault detector 140 determines whether a potential fault is detected in positioning device 160, fault detector 140 is configured to generate an indication signal 104 that indicates whether or not the potential fault is detected. For example, when a potential fault is detected, indication signal 104 may output a logic "one" or high-voltage level. Conversely, if fault detector 140 does not detect a potential fault, indication signal 104 may output a logic "zero" or low-voltage level for instance. Controller 142 can be representative of one or more processors and/or controllers in fault detector 140.

Memory 144 may include any appropriate type of mass storage provided to store any type of information that controller 142 may need in order to operate. Memory 144 may be a volatile or non-volatile, magnetic, semiconductor, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 142 may be configured to store one or more programs for execution by controller 142 for detecting a potential fault in positioning device 160, as disclosed herein.

Memory 144 may be further configured to store information and data used by controller 142. For instance, memory 144 may be configured to store gain values, biases, and thresholds for detecting a potential fault in positioning device 160.

In some embodiments, controller 142 and memory 144 of fault detector 140 may be the same circuits, processor, and/or memory of receiver 120, configured to perform operations for detecting a potential fault in positioning device 160, as disclosed herein.

As shown in FIG. 1, fault detector 140 is configured to receive a programmable gain amplifier (PGA) gain value from AGC 122 of receiver 120 via a connection 121. In some embodiments, controller 142 is configured to execute instructions stored in memory 144 to detect a potential fault in positioning device 160 based on the PGA gain, as disclosed herein. Alternatively, fault detector 140 is configured to receive an inter-channel bias, an inter-system bias, and/or an inter-band bias from navigation engine 128 of receiver 120 via a connection 123 from navigation engine 128. Controller 142 is configured to execute instructions stored in memory 144 to detect a potential fault in positioning device 160 based on the inter-channel bias, inter-system bias, and/or inter-band bias, as disclosed herein.

In some embodiments, fault detector 140 includes one or more circuits to implement fault detection methods disclosed herein by one or more finite state machines.

Figure 2:
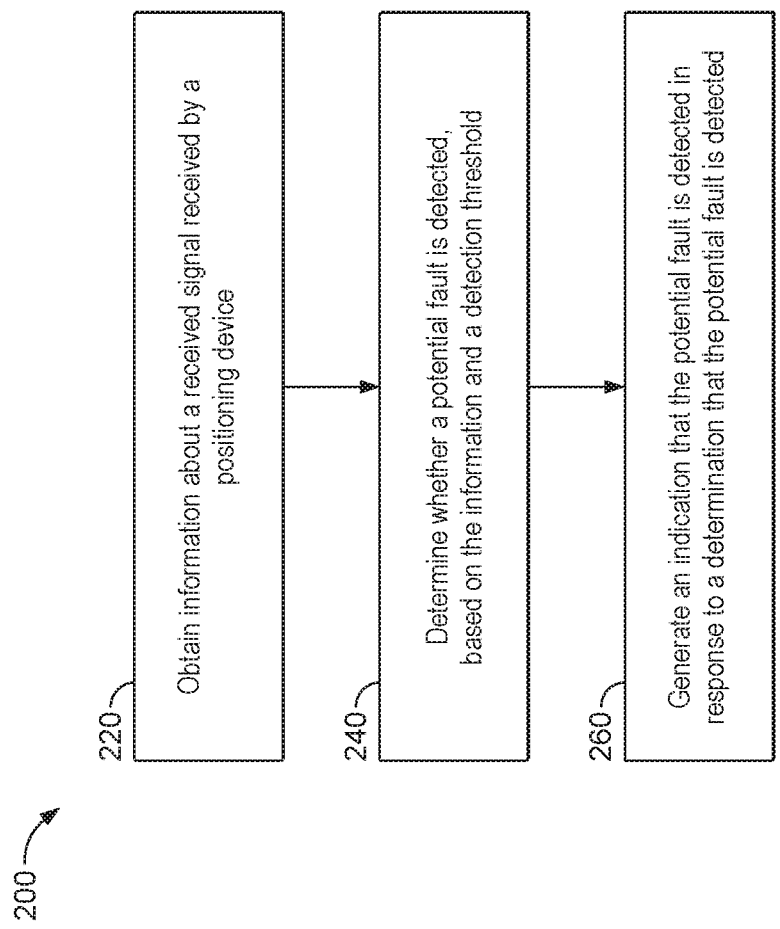
FIG. 2 is a flow chart of an exemplary method for detecting a potential fault in a positioning device, consistent with embodiments of the present disclosure.

FIG. 2 is a flow chart of an exemplary method 200 for detecting a potential fault in a positioning device, such as positioning device 160, consistent with embodiments of the present disclosure. Method 200 may be practiced by fault detector 140 disclosed and illustrated in the present disclosure. For example, controller 142 is configured to execute instructions stored in memory 144 to perform operations of method 200. As another example, fault detector 140 may include a control circuit configured to perform the operations of method 200 according to a finite state machine. Method 200 includes obtaining information about a received signal received by a positioning device (step 220), determining whether a potential fault is detected, based on the information and a detection threshold (step 240), and generating an indication that the potential fault is detected in response to a determination that the potential fault is detected (step 260).

Step 220 includes obtaining information about a received signal received by a positioning device. The information includes at least one of a control parameter or an estimation of bias based on the received signal. For example, as shown in FIG. 1, fault detector 140 is configured to receive via connection 121 information about the PGA gain from AGC 122 of receiver 120. The PGA gain is a gain control parameter that AGC 122 determines based on signal strength of a received signal received by positioning device 160. AGC 122 is configured to determine the PGA gain and send the PGA gain to a PGA in positioning device 160 to control a gain of the PGA for the received signal.

As another example, fault detector 140 is configured to receive via connection 123 information about an inter-channel bias, an inter-system bias, and/or an inter-band bias from navigation engine 128 of receiver 120. The inter-channel bias, inter-system bias, and/or inter-band bias are estimations of biases that receiver 120 estimates based on the received signal received by positioning device 160.

Alternatively, fault detector 140 may be configured to receive both the information about the PGA gain and the information about the inter-channel bias, inter-system bias, and/or inter-band bias for detecting a potential fault in positioning device 160, as described below.

Step 240 includes determining whether a potential fault is detected, based on the information and a detection threshold. For example, fault detector 140 is configured to determine whether a potential fault is detected, based on the information about the PGA gain and a gain threshold by the following steps. Fault detector 140 is configured to compare the PGA gain with the gain threshold. In response to a comparison result that the PGA gain is greater than the gain threshold, fault detector 140 is configured to determine that the potential fault is detected in positioning device 160.

Alternatively, fault detector 140 can be configured to determine whether a potential fault is detected, based on the information about the inter-channel bias, inter-system bias, and/or inter-band bias, upper bias thresholds, and lower bias thresholds by the following steps. Fault detector 140 is configured to compare one of the biases with at least one of the corresponding upper or lower bias threshold. In response to a comparison result that the one of the biases is greater than the corresponding upper bias threshold or less than the corresponding lower bias threshold, fault detector 140 is configured to determine that the potential fault is detected in positioning device 160.

In some embodiments, fault detector 140 can be configured to compare multiple biases with corresponding upper or lower bias thresholds. In response to a comparison result that one or more of the multiple biases are greater than the corresponding upper bias thresholds or less than the corresponding lower bias thresholds, fault detector 140 is configured to determine that the potential fault is detected in positioning device 160.

Moreover, in some embodiments, fault detector 140 can be configured to determine whether a potential fault is detected, based on both the information about the PGA gain and the information about the inter-channel bias, inter-system bias, and/or inter-band bias, the gain threshold, the upper bias thresholds, and the lower bias thresholds, as described for embodiments herein.

Step 260 includes generating an indication that the potential fault is detected in response to a determination that the potential fault is detected. For example, when fault detector 140 determines that the potential fault is detected, fault detector 140 is configured to generate indication signal 104 to indicate whether the potential fault is detected in positioning device 160. Indication signal 104 can be an alert signal of the potential fault in positioning device 160. The alert signal may be used to indicate reliability of current positioning results of positioning device 160. For example, when indication signal 104 is a logic "one," the current positioning results may be considered unreliable. When indication signal 104 is a logic "zero," the current positioning results may be considered reliable. In some embodiments, indication signal 104 can be used to decide whether navigation information should be updated according to the current positioning results.

Figure 3:
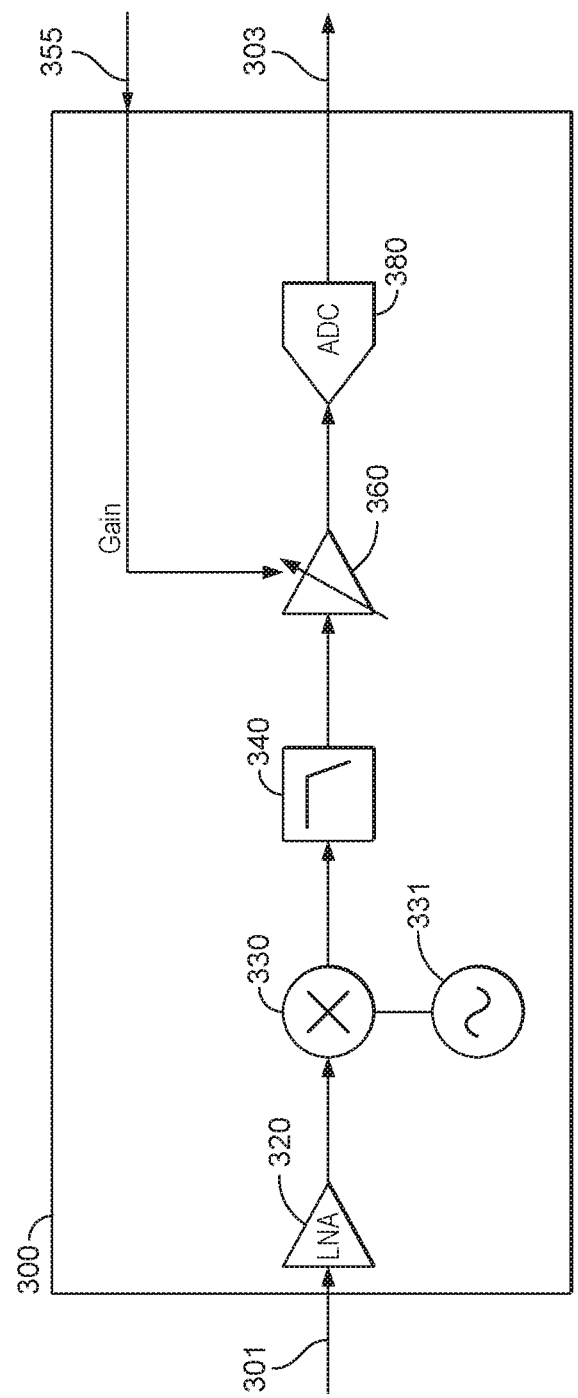
FIG. 3 is a block diagram of an exemplary front-end circuit in a receiver of a positioning device, consistent with embodiments of the present disclosure.

FIG. 3 is a block diagram of an exemplary front-end circuit 300 in a receiver of a positioning device, consistent with embodiments of the present disclosure. As shown in FIG. 3, front-end circuit 300 includes a low-noise amplifier (LNA) 320, a mixer 330, a local oscillator 331, a low-pass filter (LPF) 340, a PGA 360, and an analogue-to-digital converter (ADC) 380. LNA 320, mixer 330, LPF 340, PGA 360, and ADC 380 are coupled in cascade to process a received signal from an input 301 and output a received digital signal at an output 303. Mixer 330 is coupled to local oscillator 331 to receive a local oscillator signal and mix the received signal with the local oscillator signal. An automatic gain controller (AGC), not shown in FIG. 3, is coupled to output 303 to measure received signal strength and send a gain control parameter via a feedback connection 355 to PGA 360.

LNA 320, mixer 330, LPF 340, and PGA 360 are configured to amplify and filter the received signal from input 301. ADC 380 is configured to convert the amplified and filtered received signal into the received digital signal. The AGC is configured to determine a suitable gain for subsequently received signals based on a current received digital signal, and send the suitable gain as a gain control parameter via feedback connection 355 to PGA 360. PGA 360 is configured to receive the gain control parameter and amplify or attenuate subsequently received signals for a suitable SNR based on the gain control parameter from the AGC.

Front-end circuit 300 can operate as front end 121 in FIG. 1. In this way, AGC 122 of FIG. 1 is configured to determine the suitable gain and send the suitable gain as the gain control parameter via feedback connection 355 to PGA 360 in FIG. 3. Thus, front-end circuit 300 is described below as an implementation of front end 121, where AGC 122 is configured to control a gain value of PGA 360.

When positioning device 160 starts to receive signals for positioning, AGC 122 is configured to adjust the gain of PGA 360 to a suitable value of gain according to signal strength of initially received signals. The received signals may have varied signal strengths due to interference and/or noise. Nonetheless, when all components of positioning device 160 operate without a fault, the gain of PGA 360 may move up and down but remain within a gain threshold.

When a fault exists in one of the components of positioning device 160, the fault may cause anomalous degradation in the signal strength of the received signals. When the signal strength of the received signals degrades, AGC 122 is configured to increase the gain of PGA 360 in order to maintain stable signal strength of the received signals, which may result in a considerable increase in the gain of PGA 360. The increased gain of PGA 360 may be greater than the gain threshold because of the fault in the one of the components of positioning device 160. Accordingly, method 200 can be practiced by fault detector 140 for detecting a potential fault in one of the components of positioning device 160 as described below.

The information about a received signal at step 220 includes information about a gain control parameter. The gain control parameter is, for example, a current gain $G_c$ of PGA 360 that AGC 122 sets to maintain suitable signal strength of the received signals. PGA 360 has a nominal gain $G_N$ after positioning device 160 is initialized and starts to receive signals for positioning. The nominal gain $G_N$ of PGA 360 is a gain that supports receiver 120 to receive signals with suitable signal strength for processing. The nominal gain $G_N$ can be an average gain that supports positioning device 160 to operate and provide accurate position fixes when all components of positioning device 160 operate without a fault.

The detection threshold in step 240 includes a gain threshold equal to the nominal gain $G_N$ plus a delta value of gain dG, i.e., the gain threshold=$G_N$+dG. The delta value of gain dG can be, for example, 3 or 5 dB, which is a margin to allow variations in the gain of PGA 360 because of interference and/or noise.

Determining whether the potential fault is detected at step 240 includes determining whether the current gain $G_c$ of PGA 360 is greater than the gain threshold. Mathematically, this can be expressed as:

$$\text{Potential Fault} = \begin{cases} \text{Not Detected} & \text{if } G_c \leq G_N + dG \\ \text{Detected} & \text{if } G_c > G_N + dG \end{cases} \quad (1)$$

Specifically, determining whether the potential fault is detected at step 240 includes comparing the gain control parameter with the gain threshold. In response to a comparison result that the gain control parameter is greater than the gain threshold, step 240 further includes determining that the potential fault is detected. In response to a comparison result that the gain control parameter is less than or equal to the gain threshold, step 240 further includes determining that the potential fault is not detected.

In other words, if the current gain a of PGA 360 is less than or equal to the gain threshold, i.e., $G_c \leq G_N + dG$, fault detector 140 is configured to determine that the potential fault is not detected. If the current gain $G_c$ of PGA 360 is greater than the gain threshold, i.e., $G_c > G_N + dG$, fault detector 140 is configured to determine that the potential fault is detected.

In some embodiments, the gain control parameter obtained at step 220 includes a current gain of the PGA in the receiver of the positioning device. The gain threshold in step 240 includes a nominal gain of the PGA plus a delta value of gain. For example, the gain control parameter that fault detector 140 obtains is the current gain $G_c$ of PGA 360 in receiver 120 of positioning device 160. Fault detector 140 compares the current gain $G_c$ of PGA 360 with the gain threshold that includes the nominal gain $G_N$ of PGA 360 plus the delta value of gain dG.

In some embodiments, the nominal gain in method 200 includes at least one of a predetermined value of gain stored in the at least one memory, an initialized value of gain obtained from an initialization of the receiver, or a low-pass filtered value of gain.

For example, controller 142 of fault detector 140 is configured to read a predetermined value of gain stored in memory 144 as the nominal gain $G_N$. The predetermined value of gain may be input and stored in memory 144 by a user. Alternatively, the predetermined value of gain may be an average gain of PGA 360 determined based on signals previously received by receiver 120 for positioning.

As another example, controller 142 of fault detector 140 may be configured to obtain an initialized value of gain of PGA 360 as the nominal gain $G_N$, when receiver 120 is configured to execute an initialization procedure. When receiver 120 executes the initialization procedure, AGC 122 is configured to control a gain of PGA 360 to a suitable value that allows receiver 120 to receive signals with suitable signal strength for positioning. Controller 142 is configured to store the initialized value of gain as the nominal gain $G_N$ in memory 144. Alternatively, controller 142 may be configured to store the initialized value of gain as the nominal gain $G_N$ in a one-time-programmable memory.

Alternatively, controller 142 of fault detector 140 can be configured to obtain a low-pass filtered value of gain of PGA 360 as the nominal gain $G_N$. When AGC 122 adjusts the gain of PGA 360 by a plurality of values of gain over a period of time, controller 142 can be configured to low-pass filter the plurality of values of gain to obtain the low-pass filtered value of gain of PGA 360 as the nominal gain $G_N$. For example, controller 142 may calculate a running average of the plurality of values of gain. Controller 142 is configured to store the low-pass filtered value of gain of PGA 360 in memory 144.

In the embodiments described above with reference to FIGS. 1-3, a gain of PGA 360 is considered as varied within the gain threshold when all components of positioning device 160 operate without a fault. PGA 360 has a low-pass characteristic. When the gain of PGA 360 increases, an amplification bandwidth of PGA 360 decreases. If the gain of PGA 360 increases to a high level, the information about a received signal in step 220 can include information about an estimation of bias due to group delay variations on the received signal. In particular, an estimation of bias due to group delay variations on positioning signals close to band edges, such as BeiDou B1D1 signals in the BeiDou Navigation Satellite System (BDS), GLONASS L1OF and L2OF signals in the global navigation satellite system (GLONASS), and Galileo E5b signals in the Galileo positioning system, can be used in method 200 for detecting a potential fault in a positioning device.

In some embodiments, information about a received signal obtained in step 220 can include information about an inter-channel bias (ICB) estimation between two channels of a positioning system. The detection threshold in step 240 includes a first ICB threshold and a second ICB threshold. The first ICB threshold is greater than the second ICB threshold. Determining whether the potential fault is detected in step 240 includes at least one of: comparing the ICB estimation with the first ICB threshold, or comparing the ICB estimation with the second ICB threshold; and determining that the potential fault is detected in response to one of: a comparison result that the ICB estimation is greater than the first ICB threshold, or a comparison result that the ICB estimation is less than the second ICB threshold.

For example, when receiver 120 of positioning device 160 receives GLONASS signals, signals of different GLONASS frequency division multiple access (FDMA) channels contain different group delays because of frequency-dependent distortions in GLONASS signals. For signal compensation and positioning accuracy, receiver 120 is configured to estimate an ICB between two GLONASS FDMA channels caused by different group delays. In other words, receiver 120 is configured to estimate an ICB between first and second GLONASS FDMA channels as an ICB of the first channel. The second GLONASS channel can be any one of GLONASS FDMA channels. The ICB estimation is an estimation of a per-channel delay.

An ICB between two GLONASS FDMA channels may vary but will vary within a range between an upper limit and a lower limit when all components of positioning device 160 operate without a fault. However, when a fault exists in one of the components of positioning device 160, the fault may cause an anomalous ICB to be greater than the upper limit or less than the lower limit. Thus, fault detector 140 can be configured to practice method 200 for detecting a potential fault in one of the components of positioning device 160 as described below.

Fault detector 140 is configured to obtain information about an ICB estimation between two GLONASS FDMA channels from navigation engine 128 of receiver 120 via connection 123. The ICB estimation is, for example, a current ICB, $ICB_C$, of the two GLONASS FDMA channels. Receiver 120 has a nominal ICB, $ICB_N$, after positioning device 160 is initialized and starts to receive GLONASS signals for positioning. The nominal ICB, $ICB_N$, is an ICB between the two GLONASS FDMA channels when all components of positioning device 160 operate without a fault. The nominal ICB, $ICB_N$, can be an average ICB when positioning device 160 operates and provides accurate positioning information.

The detection threshold in step 240 includes a first ICB threshold equal to the nominal ICB, $ICB_N$, plus a first delta value of ICB, $dICB_1$, i.e., the first ICB threshold=$ICB_N$+$dICB_1$. The first delta value $dICB_1$ can be, for example, 3 or 5 centimetres per channel (cm/channel), which is a first margin to allow variations in an ICB because of varied group delays in two different channels. The first ICB threshold is an upper limit of ICB between the two GLONASS FDMA channels.

The detection threshold in step 240 also includes a second ICB threshold equal to the nominal ICB, $ICB_N$, minus a second delta value of ICB, $dICB_2$, i.e., the second ICB threshold=$ICB_N$-$dICB_2$. The second delta value $dICB_2$ can be, for example, 2 or 3 centimetres per channel (cm/channel), which is a second margin to allow for variations in an ICB because of varied group delays in two different GLONASS FDMA channels. The second ICB threshold is a lower limit of ICB between the two GLONASS FDMA channels. The first ICB threshold, i.e., the upper limit of ICB, is greater than the second ICB threshold, i.e., the lower limit of ICB.

Determining whether the potential fault is detected at step 240 includes determining whether the current ICB, $ICB_C$, between two GLONASS FDMA channels is above a first ICB threshold or below a second ICB threshold. Mathematically, this may be expressed as:

$$\text{Potential Fault} = \begin{cases} \text{Not Detected} & \text{if } ICB_N - dICB_2 \le ICB_C \le ICB_N + dICB_1 \\ \text{Detected} & \text{if } ICB_C > ICB_N + dICB_1 \text{ or } ICB_C < ICB_N - dICB_2 \end{cases} \quad (2)$$

Specifically, determining whether the potential fault is detected in step 240 includes comparing the current ICB, $ICB_C$, with the first ICB threshold $ICB_N$+$dICB_1$. In response to a comparison result that the current ICB is greater than the first ICB threshold, i.e., $ICB_C$>$ICB_N$+$dICB_1$, step 240 further includes determining that the potential fault is detected.

In response to a comparison result that the current ICB is less than or equal to the first ICB threshold, step 240 includes comparing the current ICB, $ICB_C$, with the second ICB threshold $ICB_N$-$dICB_2$. In response to a comparison result that the current ICB is less than the second ICB threshold, i.e., $ICB_C$<$ICB_N$-$dICB_2$, step 240 further includes determining that the potential fault is detected.

In response to a comparison result that the current ICB is less than or equal to the first ICB threshold and greater than or equal to the second ICB threshold, step 240 further includes determining that the potential fault is not detected.

In step 240, either one of the comparisons between the current ICB and the first ICB threshold and between the current ICB and the second ICB threshold can be performed before the other. When one of the comparisons results in a determination that the potential fault is detected, the other comparison may not be performed.

In other words, if the current ICB, $ICB_C$, is greater than the first ICB threshold $ICB_N$+$dICB_1$, or less than the second ICB threshold $ICB_N$-$dICB_2$, fault detector 140 is configured to determine that a potential fault is detected in positioning device 160. If the current ICB, $ICB_C$, is less than or equal to the first ICB threshold $ICB_N$+$dICB_1$, and greater than or equal to the second ICB threshold $ICB_N$-$dICB_2$, fault detector 140 is configured to determine that the potential fault is not detected in positioning device 160.

In some embodiments, the nominal ICB in method 200 includes at least one of a predetermined value of ICB stored in the at least one memory, an initialized value of ICB obtained from an initialization of a receiver of the positioning device, or a low-pass filtered value of ICB.

For example, controller 142 of fault detector 140 may be configured to read a predetermined value of ICB stored in memory 144 as the nominal ICB, $ICB_N$. The predetermined value of ICB may be input and stored in memory 144 by a user. Alternatively, the predetermined value of ICB may be an average ICB determined based on signals previously received by receiver 120 for positioning.

As another example, controller 142 of fault detector 140 may be configured to obtain an initialized value of ICB as the nominal ICB, $ICB_N$, when receiver 120 is configured to execute an initialization procedure. When receiver 120 executes the initialization procedure, navigation engine 128 is configured to estimate an ICB between two GLONASS FDMA channels. Controller 142 is configured to store the initialized value of ICB as the nominal ICB, $ICB_N$, in memory 144. Alternatively, controller 142 may be configured to store the initialized value of ICB as the nominal ICB, $ICB_N$, in a one-time-programmable memory.

Alternatively, controller 142 of fault detector 140 can be configured to obtain a low-pass filtered value of ICB as the nominal ICB, $ICB_N$. When navigation engine 128 estimates a plurality of values of ICB between the two GLONASS FDMA channels over a period of time, controller 142 can be configured to low-pass filter the plurality of values of ICB to obtain the low-pass filtered value of ICB as the nominal ICB, $ICB_N$. For example, controller 142 may calculate a running average of the plurality of values of ICB. Controller 142 is configured to store the low-pass filtered value of ICB in memory 144.

In some embodiments, the ICB estimation in method 200 includes an estimation of group delay between the two channels of the positioning system. For example, the ICB estimation in method 200 is an estimation of group delay between two channels of the GLONASS. Alternatively, the ICB estimation in method 200 may be an estimation of group delay between two channels of other satellite positioning systems.

In some embodiments, the received signal in step 220 is a first received signal from a first positioning system and the positioning device is configured to receive a second received signal from a second positioning system. In such embodiments, the information in step 220 includes an inter-system bias (ISB) estimation between the first and second positioning systems based on the first and second received signals. The detection threshold in step 240 includes a first ISB threshold and a second ISB threshold. The first ISB threshold is greater than the second ISB threshold. Determining whether the potential fault is detected at step 240 includes at least one of: comparing the ISB estimation with the first ISB threshold, or comparing the ISB estimation with the second ISB threshold; and determining that the potential fault is detected responsive to one of: a comparison result that the ISB estimation is greater than the first ISB threshold, or a comparison result that the ISB estimation is less than the second ISB threshold.

For example, when receiver 120 of positioning device 160 is configured to receive GLONASS and Galileo signals, GLONASS and Galileo signals contain different group delays because of frequency-dependent distortions in the signals at different frequencies. For instance, receiver 120 is configured to receive GLONASS L1OF signals at 1598.1 to 1605.4 MHz and Galileo E1BC signals at 1575 MHz. Alternatively, receiver 120 of positioning device 160 may be configured to receive GPS L1 signals at 1575 MHz, BeiDou B1D1 signals at 1559 MHz, Galileo E1BC signals at 1575 MHz, GLONASS L1OF signals at 1598.1 MHz to 1605.4 MHz, or GPS L2C signals at 1227 MHz, BeiDou B2I signals at 1207 MHz, Galileo E5b signals at 1207 MHz, GLONASS L2OF signals at 1242.9 and 1248.6 MHz. For signal compensation and positioning accuracy, positioning device 160 is configured to estimate an ISB between signals of two GNSS constellations caused by different group delays. The estimated ISB is an inter-GNSS bias caused by group delay variations in the signals of the two GNSS constellations.

An ISB between signals of two different GNSS constellations may vary but remain within a range between an upper limit and a lower limit when all components of positioning device 160 operate without a fault. However, when a fault exists in one of the components of positioning device 160, the fault may cause an anomalous ISB that is greater than the upper limit or less than the lower limit. Thus, fault detector 140 can be configured to practice method 200 for detecting a potential fault in one of the components of positioning device 160 as described below.

Fault detector 140 is configured to obtain information about an ISB estimation between signals of two GNSS constellations from receiver 120 of positioning device 160 via connection 123. The ISB estimation is, for example, a current ISB, $ISB_C$, of the signals of the two GNSS constellations. Positioning device 160 obtains a nominal ISB, $ISB_N$, after positioning device 160 is initialized and starts to receive signals of the two GNSS constellations for positioning. The nominal ISB, $ISB_N$, is an ISB between signals of the two GNSS constellations when all components of positioning device 160 operate without a fault. The nominal ISB, $ISB_N$, can be an average ISB when positioning device 160 operates and provides accurate positioning information.

The detection threshold in step 240 includes a first ISB threshold equal to the nominal ISB, $ISB_N$, plus a first delta value of ISB, $dISB_1$, i.e., the first ISB threshold=$ISB_N$+$dISB_1$. The first delta value $dISB_1$ can be, for example, 50 or 60 centimetres per system (cm/system), which is a first margin to allow variations in an ISB because of varied group delays in the signals of the two GNSS constellations. The first ISB threshold is an upper limit of ISB between the signals of the two GNSS constellations.

The detection threshold in step 240 also includes a second ISB threshold equal to the nominal ISB, $ISB_N$, minus a second delta value of ISB, $dISB_2$, i.e., the second ISB threshold=$ISB_N$−$dISB_2$. The second delta value $dISB_2$ can be, for example, 40 or 50 centimetres per system (cm/system), which is a second margin to allow for variations in an ISB because of varied group delays in the signals of the two GNSS constellations. The second ISB threshold is a lower limit of ISB between the signals of the two GNSS constellations. The first ISB threshold, i.e., the upper limit of ISB, is greater than the second ISB threshold, i.e., the lower limit of ISB.

Determining whether the potential fault is detected at step 240 includes determining whether the current ISB, $ISB_C$, between two GNSS constellations is above a first ISB threshold or below a second ISB threshold. Mathematically, this may be expressed as:

$$\text{Potential Fault} = \begin{cases} \text{Not Detected} & \text{if } ISB_N - dISB_2 \leq ISB_C \leq ISB_N + dISB_1 \\ \text{Detected} & \text{if } ISB_C > ISB_N + dISB_1 \text{ or } ISB_C < ISB_N - dISB_2 \end{cases} \quad (3)$$

Specifically, determining whether the potential fault is detected in step 240 includes comparing the current ISB, $ISB_C$, with the first ISB threshold $ISB_N$+$dISB_1$. In response to a comparison result that the current ISB is greater than the first ISB threshold, i.e., $ISB_C$>$ISB_N$+$dISB_1$, step 240 further includes determining that the potential fault is detected.

In response to a comparison result that the current ISB is less than or equal to the first ISB threshold, step 240 includes comparing the current ISB, $ISB_C$, with the second ISB threshold $ISB_N$−$dISB_2$. In response to a comparison result that the current ISB is less than the second ICB threshold, i.e., $ISB_C$<$ISB_N$−$dISB_2$, step 240 further includes determining that the potential fault is detected.

In response to a comparison result that the current ISB is less than or equal to the first ISB threshold and greater than or equal to the second ISB threshold, i.e., $ISB_N$−$dISB_2$≤$ISB_C$≤$ISB_N$+$dISB_1$, step 240 further includes determining that the potential fault is not detected.

In step 240, either one of the comparisons between the current ISB and the first ISB threshold and between the current ISB and the second ISB threshold can be performed before the other. When one of the comparisons results in a determination that the potential fault is detected, the other comparison may not be performed. Alternatively, when one of the comparisons results in a determination that the potential fault is detected, the other comparison may still be performed.

In other words, if the current ISB, $ISB_C$, is greater than the first ISB threshold $ISB_N$+$dISB_1$, or less than the second ISB threshold $ISB_N$−$dISB_2$, fault detector 140 is configured to determine that a potential fault is detected in positioning device 160. If the current ISB, $ISB_C$, is less than or equal to the first ISB threshold $ISB_N$+$dISB_1$, and greater than or equal to the second ISB threshold $ISB_N$−$dISB_2$, fault detector 140 is configured to determine that the potential fault is not detected in positioning device 160.

In some embodiments, the nominal ISB in method 200 includes at least one of a predetermined value of ISB stored in the at least one memory, an initialized value of ISB obtained from an initialization of a receiver of the positioning device, or a low-pass filtered value of ISB.

For example, controller 142 of fault detector 140 is configured to read a predetermined value of ISB stored in memory 144 as the nominal ISB, $ISB_N$. The predetermined value of ISB may be input and stored in memory 144 by a user. Alternatively, the predetermined value of ISB may be an average ISB determined based on signals previously received by GNSS receiver 452 and GNSS receiver 454 for positioning.

As another example, controller 142 of fault detector 140 may be configured to obtain an initialized value of ISB as the nominal ISB, $ISB_N$, when receiver 120 of positioning device 160 is configured to execute an initialization procedure. When receiver 120 executes the initialization procedure, receiver 120 is configured to estimate an ISB between signals of two GNSS constellations. Controller 142 is configured to store the initialized value of ISB as the nominal ISB, $ISB_N$, in memory 144. Alternatively, controller 142 may be configured to store the initialized value of ISB as the nominal ISB, $ISB_N$, in a one-time-programmable memory.

Alternatively, controller 142 of fault detector 140 can be configured to obtain a low-pass filtered value of ISB as the nominal ISB, $ISB_N$. When receiver 120 estimates a plurality of values of ISB between the two GNSS constellations over a period of time, controller 142 can be configured to low-pass filter the plurality of values of ISB to obtain the low-pass filtered value of ISB as the nominal ISB, $ISB_N$. For example, controller 142 may calculate a running average of the plurality of values of ISB. Controller 142 is configured to store the low-pass filtered value of ISB in memory 144.

In some embodiments, the ISB estimation in step 220 is a first ISB estimation. The positioning device is configured to receive a third received signal from a third positioning system. The information in step 220 further includes a second ISB estimation between the first and third positioning systems based on the first and third received signals. The detection threshold in step 240 further includes a third ISB threshold and a fourth ISB threshold, the third ISB threshold being greater than the fourth ISB threshold. Determining whether the potential fault is detected at step 240 further includes at least one of: comparing the second ISB estimation with the third ISB threshold, or comparing the second ISB estimation with the fourth ISB threshold; and determining that the potential fault is detected responsive to one of: a comparison result that the second ISB estimation is greater than the third ISB threshold, or a comparison result that the second ISB estimation is less than the fourth ISB threshold.

For example, receiver 120 of positioning device 160 may be configured to receive global positioning system (GPS) and BeiDou signals. Positioning device 160 is configured to estimate a first ISB between the GPS and BeiDou signals caused by different group delays, as described above with reference to equation (3). In addition, receiver 120 of positioning device 160 is also configured to receive GLONASS signals. Positioning device 160 is configured to estimate a second ISB between the GPS and GLONASS signals caused by different group delays, similar to descriptions above with reference to equation (3).

Fault detector 140 is configured to compare the first ISB estimation with a first ISB threshold, or compare the first ISB estimation with a second ISB threshold, as described above with reference to equation (3). Fault detector 140 is also configured to compare the second ISB estimation with a third ISB threshold, or compare the second ISB estimation with a fourth ISB threshold, similar to descriptions above with reference to equation (3). Fault detector 140 is configured to determine that the potential fault is detected responsive to one of: a comparison result that the first ISB estimation is greater than the first ISB threshold, or a comparison result that the first ISB estimation is less than the second ISB threshold, or a comparison result that the second ISB estimation is greater than the third ISB threshold, or a comparison result that the second ISB estimation is less than the fourth ISB threshold.

In some embodiments, the received signal in step 220 is a first received signal from a first positioning system. The positioning device, e.g., positioning device 160, is configured to receive a plurality of received signals from a plurality of positioning systems including the first positioning system. The received signals include the first received signal. The information in step 220 includes a multiple global navigation satellite system (multi-GNSS) estimation. The multi-GNSS estimation includes a plurality of inter-system bias (ISB) estimations corresponding to a plurality of pairs of the positioning systems. The detection threshold in step 240 includes a first multi-GNSS ISB threshold, a second multi-GNSS ISB threshold, a first system-number threshold, and a second system-number threshold. The first multi-GNSS ISB threshold includes a plurality of first ISB thresholds corresponding to the pairs of the positioning systems. The second multi-GNSS ISB threshold includes a plurality of second ISB thresholds corresponding to the pairs of the positioning systems. The first ISB thresholds are respectively greater than the corresponding second ISB thresholds. Determining whether the potential fault is detected in step 240 includes (i) at least one of: (a) comparing the ISB estimations between the plurality of pairs of positioning systems with the first ISB thresholds, respectively; and determining that the multi-GNSS ISB estimation is greater than the first multi-GNSS ISB threshold when a number of comparison results that the ISB estimations are greater than the first ISB thresholds is greater than the first system-number threshold; or (b) comparing the ISB estimations with the second ISB thresholds, respectively; and determining that the multi-GNSS ISB estimation is less than the second multi-GNSS ISB threshold when a number of comparison results that the ISB estimations are less than the second ISB thresholds is greater than the second system-number threshold; and (ii) determining that the potential fault is detected, responsive to at least one of: a determination that the multi-GNSS ISB estimation is greater than the first multi-GNSS ISB threshold; or a determination that the multi-GNSS ISB estimation is less than the second multi-GNSS ISB threshold.

For example, positioning device 160 is configured to receive a GLONASS signal as described above with reference to FIG. 1. The received GLONASS signal is a first GLONASS signal from a first positioning system, i.e., the GLONASS system. Receiver 120 of positioning device 160 can be configured to respectively receive the first GLONASS signal and a first Galileo signal. The first GLONASS and first Galileo signals contain different group delays because of frequency-dependent distortions in the signals at different frequencies. For signal compensation and positioning accuracy, positioning device 160 is configured to estimate a first ISB between the two first signals of the two GNSS constellations caused by different group delays. The estimated first ISB is a first inter-GNSS bias caused by group delay variations in the first GLONASS and first Galileo signals.

Receiver 120 of positioning device 160 is configured to respectively receive second GLONASS and second Galileo signals. Similarly, positioning device 160 is configured to estimate a second ISB between the second GLONASS and second Galileo signals caused by different group delays. In this manner, positioning device 160 is configured to receive a plurality of received signals from the GLONASS and Galileo systems, including the first positioning system, i.e., the GLONASS system.

Receiver 120 of positioning device 160 is configured to respectively receive third GLONASS and third Galileo signals. Similarly, positioning device 160 is configured to estimate a third ISB between the third GLONASS and third Galileo signals caused by different group delays. In this manner, positioning device 160 is configured to receive a plurality of received signals from the GLONASS and Galileo systems, including the first positioning system, i.e., the GLONASS system. Positioning device 160 is configured to estimate a plurality of ISBs corresponding to a plurality of pairs of GLONASS and Galileo systems. Alternatively, receiver 120 of positioning device 160 can also be configured to respectively receive Galileo and BeiDou signals. Positioning device 160 is configured to estimate an ISB between the Galileo and BeiDou signals caused by different group delays. Moreover, receiver 120 of positioning device 160 can be configured to respectively receive BeiDou and global positioning system (GPS) signals. Positioning device 160 is configured to estimate an ISB between the BeiDou and GPS signals caused by different group delays. In this manner, the plurality of received signals received by positioning device 160 can be from a plurality of positioning systems, such as GLONASS, Galileo, BeiDou, and GPS systems. Thus, positioning device 160 is configured to estimate a plurality of ISBs corresponding to a plurality of pairs of positioning systems.

Similar to the $ISB_C$ in equation (3), each of the plurality of ISBs between two GNSS signals may vary but remain within a range between an upper limit and a lower limit when all components of positioning device 160 operate without a fault. However, a fault in one of the components of positioning device 160 may cause an anomalous ISB that is greater than the upper limit or less than the lower limit. Thus, fault detector 140 can be configured to practice method 200 for detecting a potential fault in one of the components of positioning device 160 as described below.

Moreover, as another example, receiver 120 of positioning device 160 may be configured to receive global positioning system (GPS) and BeiDou signals. Positioning device 160 is configured to estimate an ISB between the GPS and BeiDou signals caused by different group delays. In addition, receiver 120 of positioning device 160 is also configured to receive GPS and GLONASS signals. Positioning device 160 is configured to estimate an ISB between the GPS and GLONASS signals caused by different group delays. In this manner, the plurality of received signals received by positioning device 160 can be from a plurality of positioning systems, such as GPS, GLONASS, Galileo, and BeiDou systems. Positioning device 160 is configured to estimate a plurality of ISBs corresponding to a plurality of pairs of positioning systems. Each of the plurality of pairs of positioning systems includes the GPS system and another positioning system, such as the BeiDou or GLONASS system.

Fault detector 140 is configured to obtain information about the plurality of inter-system bias (ISB) estimations corresponding to the plurality of pairs of the positioning systems from receiver 120 via connection 123. For example, fault detector 140 is configured to obtain the plurality of ISB estimations corresponding to the plurality of pairs of the positioning systems. The plurality of ISB estimations are, for example, a plurality of current ISBs, $ISB_{Ci}$, of signals of the GNSS constellations, i=0, 1, 2, ..., SP-1, where SP is a total number of the pairs of the positioning systems. One of the pairs of the positioning systems may include the same or different two positioning systems as another one of the pairs of the positioning systems. The plurality of current ISBs, $ISB_{Ci}$, are collectively defined as a multi-GNSS ISB estimation.

Positioning device 160 obtains a plurality of nominal ISBs, $ISB_{Ni}$, i=0, 1, 2, ..., SP-1, after positioning device 160 is initialized and starts to receive signals of the GNSS constellations for positioning. The plurality of nominal ISBs, $ISB_{Ni}$, are ISBs between signals of the plurality of pairs of GNSS constellations when all components of positioning device 160 operate without a fault. The nominal ISBs, $ISB_{Ni}$, can be average ISBs when positioning device 160 operates to provide an accurate position.

The detection threshold in step 240 includes a plurality of first ISB thresholds equal to the nominal ISBs, $ISB_{Ni}$, plus a plurality of first delta values of ISB, $dISB_{1i}$, respectively, i.e., the first ISB threshold for the $i^{th}$ pair of GNSS constellations=$ISB_{Ni}+dISB_{1i}$, i=0, 1, 2, ..., SP-1. The plurality of first delta values $dISB_{1i}$ can respectively be, for example, 4 or 5 centimetres per pair of systems (cm/pair), which are a plurality of first margins to allow variations in ISBs in the plurality of pairs of GNSS constellations because of varied group delays. The plurality of first ISB thresholds are upper limits of ISB between two GNSS signals in each pair of GNSS constellations, respectively. The plurality of first ISB thresholds $ISB_{Ni}+dISB_{1i}$, i=0, 1, 2, ..., SP-1, are collectively defined as a first multi-GNSS threshold.

The detection threshold in step 240 also includes a plurality of second ISB thresholds equal to the nominal ISBs, $ISB_{Ni}$, minus a plurality of second delta values of ISB, $dISB_{2i}$, i.e., the second ISB thresholds=$ISB_{Ni}-dISB_{2i}$, i=0, 1, 2, ..., SP-1. The plurality of second delta values $dISB_{2i}$ can respectively be, for example, 4 or 5 centimetres per pair (cm/system), which are a plurality of second margins to allow variations in ISBs in the plurality of pairs of GNSS constellations because of varied group delays. The plurality of second ISB thresholds are lower limits of ISB between two GNSS signals in each pair of GNSS constellations, respectively. The plurality of second ISB thresholds $ISB_{Ni}-dISB_{2i}$, i=0, 1, 2, ..., SP-1, are collectively defined as a second multi-GNSS threshold. The plurality of first ISB thresholds, i.e., the upper limits of ISB, are respectively greater than the plurality of second ISB thresholds, i.e., the lower limits of ISB.

Determining whether the potential fault is detected at step 240 includes determining:

$$\text{Potential Fault} = \begin{cases} \text{Detected} & \text{if } ISB_{Ci} > ISB_{Ni} + dISB_{1i} \text{ for } SN1 \text{ pairs} \\ \text{Detected} & \text{if } ISB_{Ci} < ISB_{Ni} - dISB_{2i} \text{ for } SN2 \text{ pairs} \end{cases} \quad (4)$$

If neither SN1 pairs nor SN2 pairs are achieved in accordance with the above conditions, determining whether the potential fault is detected at step 240 includes determining that the potential fault is Not Detected, where SN1 and SN2 are first and second system-number thresholds.

Specifically, determining whether the potential fault is detected in step 240 includes comparing the current ISBs, $ISB_{Ci}$, with the first ISB thresholds $ISB_{Ni}+dISB_{1i}$, respectively. In response to a first number of comparison results that the ISB estimations are greater than the first ISB thresholds is greater than or equal to a first system-number threshold, SN1, i.e., $ISB_{Ci}>ISB_{Ni}+dISB_{1i}$ for SN1 or more pairs, step 240 further includes determining that a multiple GNSS (multi-GNSS) ISB estimation is greater than the first multi-GNSS ISB threshold.

In response to the first number of comparison results that the ISB estimations are greater than the first ISB thresholds is less than the first pair number threshold SN1, step 240 further includes determining that the multi-GNSS ISB estimation is less than the first multi-GNSS ISB threshold.

In response to the first number of comparison results that the ISB estimations are greater than the first ISB thresholds is less than the first pair number threshold SN1, step 240 includes comparing the current ISBs, $ISB_{Ci}$, with the second ISB thresholds $ISB_{Ni}-dISB_{2i}$, respectively. In response to a second number of comparison results that the ISB estimations are less than the second ISB thresholds is greater than or equal to a second system-number threshold SN2, i.e., $ISB_{Ci}<ISB_{Ni}-dISB_{2i}$ for SN2 or more pairs, step 240 further includes determining that the multi-GNSS ISB estimation is less than the second multi-GNSS ISB threshold.

In response to the second number of comparison results that the ISB estimations are less than the second ISB thresholds is less than the second pair number threshold SN2, step 240 further includes determining that the multi-GNSS ISB estimation is greater than the second multi-GNSS ISB threshold.

In some embodiments, in step 240, either the comparisons between the current ISBs and the first ISB thresholds or the comparisons between the current ISBs and the second ISB thresholds may be performed before the other. When either of the comparisons are performed, the other of the comparisons may not be performed. Alternatively, when either of the comparisons are performed, the other of the comparisons may still be performed.

Moreover, step 240 further includes determining that the potential fault is detected in response to at least one of: a determination that the multi-GNSS ISB estimation is greater than the first multi-GNSS ISB threshold, or a determination that the multi-GNSS ISB estimation is less than the second multi-GNSS ISB threshold.

In other words, if the first number of comparison results that the ISB estimations are greater than the first ISB thresholds is greater than or equal to the first system-number threshold SN1, i.e., $ISB_{Ci}>ISB_{Ni}+dISB_{1i}$ for SN1 or more pairs, fault detector 140 is configured to determine that a potential fault is detected in positioning device 160. If the second number of comparison results that the ISB estimations are less than the second ISB thresholds is greater than or equal to the second system-number threshold SN2, i.e., $ISB_{Ci}<ISB_{Ni}-dISB_{2i}$ for SN2 or more pairs, fault detector 140 is configured to determine that a potential fault is detected in positioning device 160.

In some embodiments, fault detector 140 can be configured to compare the ISB estimations with the first or second ISB thresholds until SN1 or SN2 pair is achieved as described in equation (4) and determine that a potential fault is detected in positioning device 160. Fault detector 140 may not be configured to compare the remaining ISB estimations with the remaining first or second ISB thresholds.

In some embodiments, fault detector 140 is configured to compare the ISB estimations with one or more of the first ISB thresholds and one or more of the second ISB thresholds until a third system-number threshold SN3 is achieved. If a sum of (a) a first number of comparison results that the ISB estimations are greater than the first ISB thresholds and (b) a second number of comparison results that the ISB estimations are less than the second ISB thresholds, is greater than or equal to the third system-number threshold SN3, fault detector 140 is configured to determine that a potential fault is detected in positioning device 160.

In some embodiments, the nominal ISBs in method 200 include at least one of predetermined values of ISB stored in the at least one memory, initialized values of ISB obtained from an initialization of the positioning device, or low-pass filtered values of ISB, similar to the nominal ISB described above with reference to equation (3).

Figure 4:
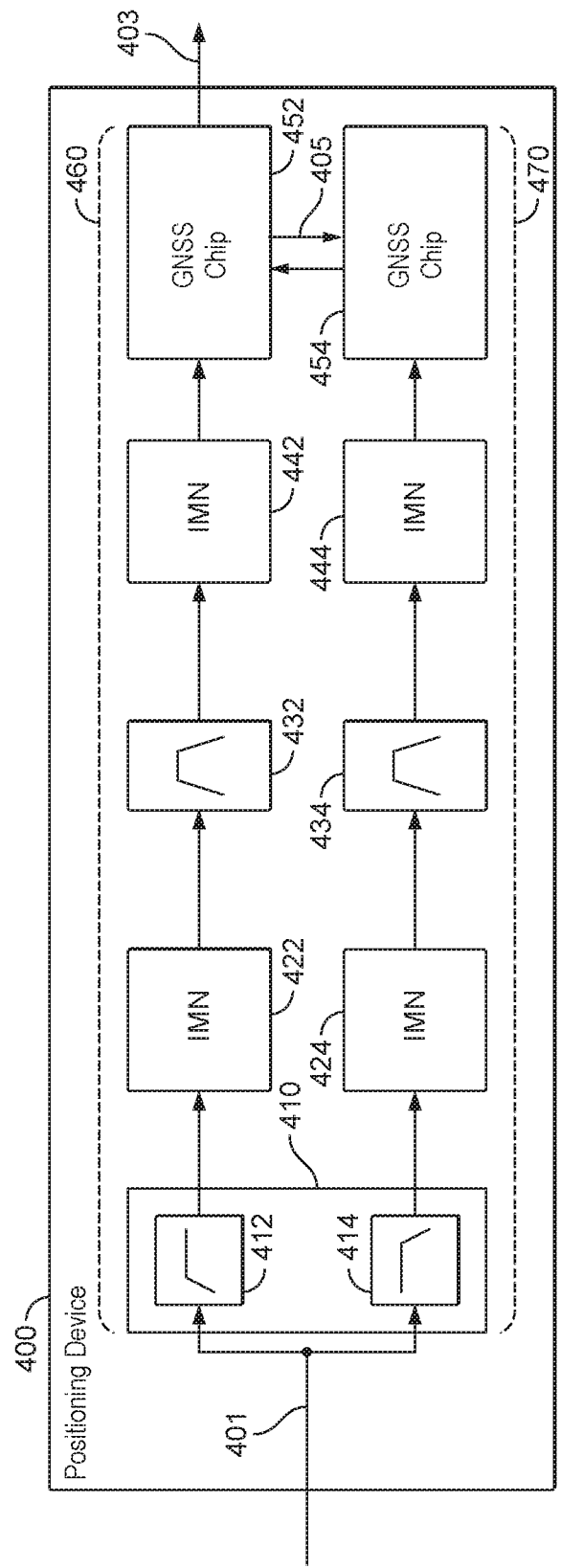
FIG. 4 is a block diagram of an exemplary positioning device, consistent with embodiments of the present disclosure.

FIG. 4 is a block diagram of an exemplary positioning device 400, consistent with embodiments of the present disclosure. As shown in FIG. 4, positioning device 400 includes a diplexer 410, first and second impedance matching networks (IMNs) 422 and 424, first and second filters 432 and 434, third and fourth impedance matching networks (IMNs) 442 and 444, and first and second global navigation satellite system (GNSS) chips 452 and 454. Diplexer 410 includes a high-pass filter (HPF) 412 and a low-pass filter (LPF) 414. HPF 412 of diplexer 410, first impedance matching network (IMN) 422, first filter 432, third impedance matching network (IMN) 442, and first GNSS chip 452 are coupled in cascade to form a first RF path 460 for receiving satellite signals in a first frequency band. LPF 414 of diplexer 410, second impedance matching network (IMN) 424, second filter 434, fourth impedance matching network (IMN) 444, and second GNSS chip 454 are coupled in cascade to form a second RF path 470 for receiving satellite signals in a second frequency band.

Diplexer 410 is configured to receive signals via an input 401 of positioning device 400 and filter the signals in the first and second frequency bands for first and second RF paths 460 and 470, respectively. In first RF path 460, HPF 412, first impedance matching network (IMN) 422, first filter 432, and third impedance matching network (IMN) 442 are configured to filter and process signals in the first frequency band for first GNSS chip 452 to track, demodulate and decode messages from satellites. Similarly, in second RF path 470, LPF 414, second impedance matching network (IMN) 424, second filter 434, and fourth impedance matching network (IMN) 444 are configured to filter and process signals in the second frequency band for second GNSS chip 454 to track, demodulate and decode messages from satellites.

In FIG. 4, impedance matching networks (IMNs) 422, 442, 424 and 444 are shown as separate blocks. A person skilled in the art, however, will appreciate that any one of these networks may instead be included as part of the preceding or succeeding block. For example, impedance matching network (IMN) 442 may instead be part of first filter 432 or GNSS chip 452. Similarly, impedance matching network (IMN) 424 may instead be included as part of LPF 414 or second filter 434.

First and second GNSS chips 452 and 454 are configured to exchange signals and/or data on two bands via a connection 405. For example, first and second RF paths 460 and 470 may be configured to receive GPS signals on L1 and L2 bands, respectively. GNSS chip 452 can be configured to acquire signals and/or data on the L2 band from GNSS chip 454 via connection 405. GNSS chip 452 is configured to send results and/or data of positioning device 400 to an external device via an output 403.

Figure 5:
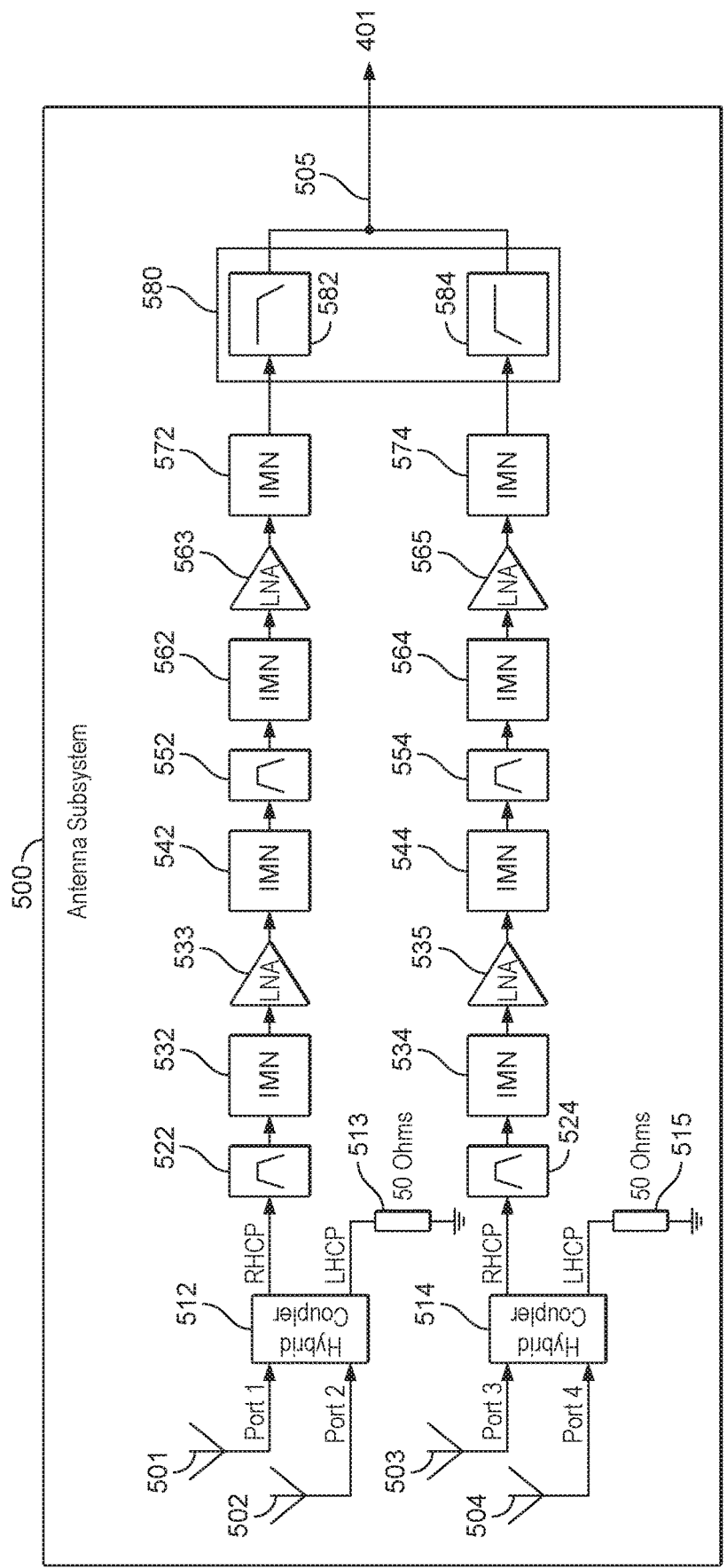
FIG. 5 is a block diagram of an exemplary antenna subsystem of a positioning device, consistent with embodiments of the present disclosure.

FIG. 5 is a block diagram of an exemplary antenna subsystem 500 of a positioning device, consistent with embodiments of the present disclosure. Antenna subsystem 500 is a dual-band GNSS antenna subsystem. As shown in FIG. 5, antenna subsystem 500 includes two antenna RF paths. A first of the two antenna RF paths includes antennas 501 and 502, a first hybrid coupler 512, a first resistor 513, a first filter 522, a first impedance matching network (IMN) 532, a first low-noise amplifier (LNA) 533, a second impedance matching network (IMN) 542, a second filter 552, a third impedance matching network (IMN) 562, a second LNA 563, and a fourth impedance matching network (IMN) 572, all coupled in cascade. The second antenna RF path includes antennas 503 and 504, a second hybrid coupler 514, a second resistor 515, a third filter 524, a fifth impedance matching network (IMN) 534, a third LNA 535, a sixth impedance matching network (IMN) 544, a fourth filter 554, a seventh impedance matching network (IMN) 564, a fourth LNA 565, and an eighth impedance matching network (IMN) 574, all coupled in cascade. The first and second antenna RF paths are coupled to a diplexer 580. Diplexer 580 includes a low-pass filter (LPF) 582 and a high-pass filter (HPF) 584.

In FIG. 5, impedance matching networks (IMNs) 532, 542, 562 and 572 of the first RF path and impedance matching networks (IMNs) 534, 544, 564 and 574 of the second RF path are shown as separate blocks. A person skilled in the art, however, will appreciate that any one of these networks may instead be incorporated as part of a preceding or succeeding block. For example, impedance matching network (IMN) 532 may instead be included as part of first filter 522 or first LNA 533.

LPF 582 and HPF 584 of diplexer 580 are coupled to fourth impedance matching network (IMN) 572 and eighth impedance matching network (IMN) 574, respectively. When the first and second antenna RF paths respectively receive signals on two frequency bands, diplexer 580 is configured to combine the signals on the two frequency bands into one dual-band RF signal at an output 505 of antenna subsystem 500.

Dual-band GNSS antenna subsystem 500 can be coupled to dual-band positioning device 400 by connecting output 505 to input 401. Diplexer 410 is configured to filter the combined dual-band RF signal for first and second RF paths 460 and 470 to process. In this manner, positioning device 400 can be configured to process dual-band signals through dual-band GNSS antenna subsystem 500.

Positioning device 400 can further include a fault detector, similar to fault detector 140 of positioning device 160. The fault detector of positioning device 400 can be configured to practice method 200 for detecting a potential fault in dual-band positioning device 400.

Alternatively, positioning device 160 can include two RF paths as positioning device 400. The implementation of dual-band positioning device 160 can be configured as dual-band positioning device 400 coupled to antenna subsystem 500, as described above. Fault detector 140 can be configured to practice method 200 for detecting a potential fault in positioning device 160 with two RF paths for two frequency bands. For convenience of description, positioning device 160 is described as a dual-band positioning device below.

In some embodiments, the information in step 220 includes an inter-band bias (IBB) estimation between two frequency bands of the positioning system. The detection threshold in step 240 includes a first IBB threshold and a second IBB threshold. The first IBB threshold is greater than the second IBB threshold. Determining whether the potential fault is detected in step 240 includes at least one of: comparing the IBB estimation with the first IBB threshold, or comparing the IBB estimation with the second IBB threshold; and determining that the potential fault is detected in response to one of: a comparison result that the IBB estimation is greater than the first IBB threshold, or a comparison result that the IBB estimation is less than the second IBB threshold.

For example, when positioning device 160 is configured to receive GPS signals on L1 and L2 frequency bands, GPS L1 and L2 signals contain different group delays because of frequency-dependent distortions in the signals on the two different frequency bands. For signal compensation and positioning accuracy, positioning device 160 is configured to estimate an IBB between signals on the GPS L1 and L2 frequency bands caused by different group delays.

Generally, an IBB between signals on two frequency bands may vary but remain within a range between an upper limit and a lower limit when all components of positioning device 160 operate without a fault. However, when a fault exists in one of the components of positioning device 160, the fault may cause an anomalous IBB that is greater than the upper limit or less than the lower limit. Thus, fault detector 140 can be configured to practice method 200 for detecting a potential fault in one of the components of positioning device 160 as described below.

Fault detector 140 is configured to obtain information about an IBB estimation between signals on two frequency bands from receiver 120 via connection 123. The IBB estimation is, for example, a current IBB, $IBB_C$, between signals on the GPS L1 and L2 frequency bands. Positioning device 160 obtains a nominal IBB, $IBB_N$, after positioning device 160 is initialized and starts to receive signals on GPS L1 and L2 frequency bands for positioning. The nominal IBB, $IBB_N$, is an IBB between the signals on the GPS L1 and L2 frequency bands when all components of positioning device 160 operate without a fault. The nominal IBB, $IBB_N$, can be an average IBB when positioning device 160 operates and provides accurate positioning information.

Fault detector 140 can be configured to obtain from memory 144 a first IBB threshold equal to the nominal IBB, $IBB_N$, plus a first delta value of IBB, $dIBB_1$, i.e., the first IBB threshold=$IBB_N$+$dIBB_1$. The first delta value $dIBB_1$ can be, for example, 20 or 30 centimetres per band (cm/band), which is a first margin to allow variations in an IBB because of varied group delays in the signals on the GPS L1 and L2 frequency bands. The first IBB threshold is an upper limit of IBB between the signals on GPS L1 and L2 frequency bands.

Fault detector 140 is configured to obtain from memory 144 a second IBB threshold equal to the nominal IBB, $IBB_N$, minus a second delta value of IBB, $dIBB_2$, i.e., the second IBB threshold=$IBB_N$−$dIBB_2$. The second delta value of IBB $dIBB_2$ can be, for example, 40 or 50 centimetres per band (cm/band), which is a second margin to allow variations in an IBB because of varied group delays in the signals on GPS L1 and L2 frequency bands. The second IBB threshold is a lower limit of IBB between the signals on the GPS L1 and L2 frequency bands. The first IBB threshold, i.e., the upper limit of IBB, is greater than the second IBB threshold, i.e., the lower limit of IBB.

Determining whether the potential fault is detected at step 240 includes determining whether the current IBB, $IBB_C$, between the two GNSS frequency bands is above a first IBB threshold or below a second IBB threshold. Mathematically, this may be expressed as:

$$\text{Potential Fault} = \begin{cases} \text{Not Detected} & \text{if } IBB_N - dIBB_2 \leq IBB_C \leq IBB_N + dIBB_1 \\ \text{Detected} & \text{if } IBB_C > IBB_N + dIBB_1 \text{ or } IBB_C < IBB_N - dIBB_2 \end{cases} \quad (5)$$

Specifically, determining whether the potential fault is detected in step 240 includes comparing the current IBB, $IBB_C$, with the first IBB threshold $IBB_N+dIBB_1$. In response to a comparison result that the current IBB is greater than the first IBB threshold, i.e., $IBB_C>IBB_N+dIBB_1$, step 240 further includes determining that the potential fault is detected.

In response to a comparison result that the current IBB is less than or equal to the first IBB threshold, step 240 includes comparing the current IBB, $IBB_C$, with the second IBB threshold $IBB_N-dIBB_2$. In response to a comparison result that the current IBB is less than the second IBB threshold, i.e., $IBB_C<IBB_N-dIBB_2$, step 240 further includes determining that the potential fault is detected.

In response to a comparison result that the current IBB is less than or equal to the first IBB threshold and greater than or equal to the second IBB threshold, i.e., $IBB_N-dIBB_2 \leq IBB_C \leq IBB_N+dIBB_1$, step 240 further includes determining that the potential fault is not detected.

In step 240, either one of the comparisons between the current IBB and the first IBB threshold and between the current IBB and the second IBB threshold can be performed before the other. When one of the comparisons results in a determination that the potential fault is detected, the other comparison may not be performed. Alternatively, when one of the comparisons results in a determination that the potential fault is detected, the other comparison may still be performed.

In other words, if the current IBB, $IBB_C$, is greater than the first IBB threshold $IBB_N+dIBB_1$, or less than the second IBB threshold $IBB_N-dIBB_2$, fault detector 140 is configured to determine that a potential fault is detected in positioning device 160. If the current IBB, $IBB_C$, is less than or equal to the first IBB threshold $IBB_N+dIBB_1$, and greater than or equal to the second IBB threshold $IBB_N-dIBB_2$, fault detector 140 is configured to determine that the potential fault is not detected in positioning device 160.

In some embodiments, the nominal IBB in method 200 includes at least one of a predetermined value of IBB stored in the at least one memory, an initialized value of IBB obtained from an initialization of a receiver of the positioning device, or a low-pass filtered value of IBB.

For example, controller 142 of fault detector 140 is configured to read a predetermined value of IBB stored in memory 144 as the nominal IBB, $IBB_N$. The predetermined value of IBB may be input and stored in memory 144 by a user. Alternatively, the predetermined value of IBB may be an average IBB determined based on signals previously received by receiver 120 for positioning.

As another example, controller 142 of fault detector 140 may be configured to obtain an initialized value of IBB as the nominal IBB, $IBB_N$, when receiver 120 is configured to execute an initialization procedure. When receiver 120 executes the initialization procedure, receiver 120 is configured to estimate an IBB between signals on two frequency bands of a positioning system. Controller 142 is configured to store the initialized value of IBB as the nominal IBB, $IBB_N$, in memory 144. Alternatively, controller 142 may be configured to store the initialized value of IBB as the nominal IBB, $IBB_N$, in a one-time-programmable memory.

Alternatively, controller 142 of fault detector 140 can be configured to obtain a low-pass filtered value of IBB as the nominal IBB, $IBB_N$. When receiver 120 estimates a plurality of values of IBB between two frequency bands of a positioning system over a period of time, controller 142 can be configured to low-pass filter the plurality of values of IBB to obtain the low-pass filtered value of IBB as the nominal IBB, $IBB_N$. For example, controller 142 may calculate a running average of the plurality of values of IBB. Controller 142 is configured to store the low-pass filtered value of IBB in memory 144.

In some embodiments, the IBB estimation in method 200 includes a plurality of IBB-band estimations corresponding to a plurality of pairs of frequency bands. The first IBB threshold used in method 200 includes a plurality of first IBB-band thresholds corresponding to the pairs of frequency bands. The second IBB threshold used in method 200 includes a plurality of second IBB-band thresholds corresponding to the pairs of frequency bands. Comparing the IBB estimation with the first IBB threshold in method 200 includes comparing the plurality of IBB-band estimations with the first IBB-band thresholds, respectively; and determining that the IBB estimation is greater than the first IBB threshold when a number of comparison results that the IBB-band estimations are greater than the first IBB-band thresholds is greater than a first band-number threshold. Comparing the IBB estimation with the second IBB threshold in method 200 includes comparing the IBB-band estimations with the second IBB-band thresholds, respectively; and determining that the IBB estimation is less than the second IBB threshold when a number of comparison results that the IBB-band estimations are less than the second IBB-band thresholds is greater than a second band-number threshold.

For example, positioning device 160 is configured to estimate a plurality of IBB-band estimations corresponding to a plurality of pairs of frequency bands of the GPS system. Fault detector 140 is configured to obtain the plurality of IBB-band estimations corresponding to the plurality of pairs of frequency bands of the GPS system. The plurality of IBB-band estimations are, for example, a plurality of current IBB-band estimations $IBB_{Ci}$ of signals on GPS L1 and L2 frequency bands, i=0, 1, 2, . . . , BP−1, where BP is a total number of the pairs of the frequency bands. One of the pairs of the frequency bands may include the same or different frequency bands as another one of the pairs of the frequency bands. The plurality of current IBB-band estimations $IBB_{Ci}$, i=0, 1, 2, . . . , BP−1, are collectively defined as an IBB estimation estimated by positioning device 160.

Positioning device 160 obtains a plurality of nominal IBB-band estimations $IBB_{Ni}$, i=0, 1, 2, . . . , BP−1, after positioning device 160 is initialized and starts to receive signals on the pairs of the GPS frequency bands. The plurality of nominal IBB-band estimations $IBB_{Ni}$ are IBBs between signals of the plurality of pairs of GPS frequency bands when all components of positioning device 160 operate without a fault. The nominal IBB-band estimations $IBB_{Ni}$ can be average IBBs when positioning device 160 operates and provides accurate position fixes.

Fault detector 140 is configured to obtain from memory 144 a plurality of first IBB-band thresholds equal to the nominal IBB-band estimations $IBB_{Ni}$ plus a plurality of first delta values of IBB-band $dIBB_{1i}$, respectively, i.e., the first IBB-band threshold for the pair of frequency bands=$IBB_{Ni}+dIBB_{1i}$, i=0, 1, 2, . . . , BP−1. The plurality of first delta values of IBB-band $dIBB_{1i}$ can respectively be, for example, 2 or 3 centimetres per pair (cm/pair) of frequency bands, which are a plurality of first margins to allow variations in IBBs in the plurality of pairs of frequency bands because of varied group delays. The plurality of first IBB-band thresholds are upper limits of IBB between signals of two frequency bands in each pair of frequency bands, respectively. The plurality of first IBB-band thresholds $IBB_{Ni}+dIBB_{1i}$, i=0, 1, 2, ..., BP−1, are collectively defined as a first IBB threshold.

Fault detector 140 is also configured to obtain from memory 144 a plurality of second IBB-band thresholds equal to the nominal IBB-band estimations $IBB_{Ni}$ minus a plurality of second delta values of IBB-band $dIBB_{2i}$, respectively, i.e., the second IBB-band thresholds=$IBB_{Ni}-dIBB_{2i}$, i=0, 1, 2, ..., BP−1. The plurality of second delta values of IBB-band $dIBB_{2i}$ can respectively be, for example, 2 or 3 centimetres per pair (cm/pair) of frequency bands, which are a plurality of second margins to allow variations in IBBs in the plurality of pairs of frequency bands because of varied group delays. The plurality of second IBB-band thresholds are lower limits of IBB between signals of two frequency bands in each pair of frequency bands, respectively. The plurality of second IBB-band thresholds $IBB_{Ni}-dIBB_{2i}$, i=0, 1, 2, ..., BP−1, are collectively defined as a second IBB threshold. The plurality of first IBB-band thresholds, i.e., the upper limits of IBB, are respectively greater than the plurality of second IBB-band thresholds, i.e., the lower limits of IBB.

Determining whether the potential fault is detected at step 240 includes determining:

$$\text{Potential Fault} = \begin{cases} \text{Detected} & \text{if } IBB_{Ci} > IBB_{Ni} + dIBB_{1i} \text{ for } BN1 \text{ pairs} \\ \text{Detected} & \text{if } IBB_{Ci} < IBB_{Ni} - dIBB_{2i} \text{ for } BN2 \text{ pairs} \end{cases} \quad (6)$$

If neither BN1 pairs nor BN2 pairs are achieved in accordance with the above conditions, determining whether the potential fault is detected at step 240 includes determining that the potential fault is not detected, where BN1 and BN2 are first and second band-number thresholds.

Specifically, determining whether the potential fault is detected in step 240 includes comparing the current IBB-band estimations $IBB_{Ci}$ with the first IBB-band thresholds $IBB_{Ni}+dIBB_{1i}$, respectively. In response to a number of comparison results that the IBB-band estimations are greater than the first IBB-band thresholds is greater than or equal to a first band-number threshold BN1, i.e., $IBB_{Ci} > IBB_{Ni}+dIBB_{1i}$ for BN1 or more pairs, step 240 further includes determining that an IBB estimation is greater than a first ISB threshold.

In response to the number of comparison results that the IBB-band estimations are greater than the first IBB-band thresholds is less than the first band-number threshold BN1, step 240 further includes determining that the IBB estimation is less than the first IBB threshold.

In response to the number of comparison results that the IBB-band estimations are greater than the first IBB-band thresholds is less than the first band-number threshold BN1, step 240 includes comparing the current IBB-band estimations $IBB_{Ci}$ with the second ISB-band thresholds $IBB_{Ni}-dIBB_{2i}$. In response to a number of comparison results that the IBB-band estimations are less than the second ISB-band thresholds is greater than or equal to a second band-number threshold BN2, i.e., $IBB_{Ci} < IBB_{Ni}-dIBB_{2i}$ for BN2 or more pairs, step 240 further includes determining that the IBB estimation is less than a second IBB threshold.

In response to the number of comparison results that the IBB-band estimations are less than the second ISB-band thresholds is less than the second band-number threshold BN2, step 240 further includes determining that the IBB estimation is greater than the second IBB threshold.

In some embodiments, in step 240, either the comparisons between the current IBB-band estimations and the first ISB-band thresholds or the comparisons between the current IBB-band estimations and the second IBB-band thresholds may be performed before the other. When either of the comparisons are performed, the other of the comparisons may not be performed. Alternatively, when either of the comparisons are performed, the other of the comparisons may still be performed.

Moreover, step 240 further includes determining that the potential fault is detected in response to at least one of: a determination that the IBB estimation is greater than the first IBB threshold, or a determination that the IBB estimation is less than the second IBB threshold.

In other words, if the number of comparison results that the IBB-band estimations are greater than the first IBB-band thresholds is greater than or equal to the first band-number threshold BN1, i.e., $IBB_{Ci} > IBB_{Ni}+dIBB_{1i}$ for BN1 or more pairs, fault detector 140 is configured to determine that a potential fault is detected in positioning device 160. If the number of comparison results that the IBB-band estimations are less than the second ISB-band thresholds is greater than or equal to the second band-number threshold BN2, i.e., $IBB_{Ci} < IBB_{Ni}-dIBB_{2i}$ for BN2 or more pairs, fault detector 140 is configured to determine that a potential fault is detected in positioning device 160.

In some embodiments, fault detector 140 can be configured to compare the IBB-band estimations with the first or second ISB-band thresholds until BN1 or BN2 pairs are achieved as described in equation (6) and determine that a potential fault is detected in positioning device 160. Fault detector 140 may be configured not to compare the remaining IBB-band estimations with the remaining first or second IBB-band thresholds.

In some embodiments, fault detector 140 is configured to compare the IBB-band estimations with one or more of the first IBB-band thresholds and one or more of the second IBB-band thresholds until a third band-number threshold BN3 is achieved. If a sum of (a) a first number of comparison results that the IBB-band estimations are greater than the first IBB-band thresholds and (b) a second number of comparison results that the IBB-band estimations are less than the second IBB-band thresholds, is greater than or equal to the third band-number threshold BN3, fault detector 140 is configured to determine that a potential fault is detected in positioning device 160.

In some embodiments, the nominal IBB-band estimations in method 200 include at least one of predetermined values of IBB-band stored in the at least one memory, initialized values of IBB-band obtained from an initialization of the positioning device, or low-pass filtered values of IBB-band, similar to the nominal IBB described above with reference to equation (5).

In some embodiments, the information in step 220 includes a gain control parameter and a bias estimation. The detection threshold in step 240 includes a gain threshold, a first bias threshold, and a second bias threshold. The first bias threshold is greater than the second bias threshold. Determining whether the potential fault is detected in step 240 includes comparing the gain control parameter with the gain threshold; at least one of: comparing the bias estimation with the first bias threshold, or comparing the bias estimation with the second bias threshold; and determining that the potential fault is detected in response to: a comparison result that the gain control parameter is greater than the gain threshold, and one of (i) a comparison result that the bias estimation is greater than the first bias threshold, or (ii) a comparison result that the bias estimation is less than the second bias threshold.

For example, fault detector 140 is configured to obtain information about a current gain $G_c$ of PGA 360 and a current ICB, $ICB_C$, between two GLONASS FDMA channels, as described with reference to equations (1) and (2) and FIGS. 1-3. Fault detector 140 is configured to obtain from memory 144 a gain threshold equal to the nominal gain $G_N$ plus a delta value of gain dG, i.e., the gain threshold=$G_N$+dG. Fault detector 140 is also configured to obtain from memory 144 a first ICB threshold equal to the nominal ICB, $ICB_N$, plus the first delta value $dICB_1$, i.e., the first ICB threshold=$ICB_N+dICB_1$, and a second ICB threshold equal to the nominal ICB, $ICB_N$, minus the second delta value $dICB_2$, i.e., the second ICB threshold=$ICB_N-dICB_2$, as described with reference to equations (1) and (2) and FIGS. 1-3. The first ICB threshold, i.e., the upper limit of ICB, is greater than the second ICB threshold, i.e., the lower limit of ICB.

Fault detector 140 is configured to compare the current gain $G_c$ of PGA 360 with the gain threshold $G_N$+dG. Fault detector 140 is also configured to compare the current ICB, $ICB_C$, with the first ICB threshold $ICB_N+dICB_1$, and/or compare the current ICB, $ICB_C$, with the second ICB threshold $ICB_N-dICB_2$. Fault detector 140 is configured to determine that the potential fault is detected in response to: a comparison result that the current gain $G_c$ of PGA 360 is greater than the gain threshold $G_N$+dG and one of (i) a comparison result that the current ICB, $ICB_C$, is greater than the first ICB threshold $ICB_N+dICB_1$, or (ii) a comparison result that the current ICB, $ICB_C$, is less than the second ICB threshold $ICB_N-dICB_2$.

In some embodiments, fault detector 140 can be configured to obtain information about one or more of a current gain $G_c$, of PGA 360, a current ICB, $ICB_C$, between two channels, a current $ISB_C$ between signals of two GNSS constellations, and/or a current $IBB_C$ between signals on two frequency bands, as described above with references to equations (1)-(6) and FIGS. 1-5. Fault detector 140 can be configured to determine that the potential fault is detected in response to two or more of those conditions in equations (1)-(6) are met.

In some embodiments, information in step 220 includes an estimation of at least one of an input spectrum to the positioning device, or a resulting residual of pseudorange measurements for a given estimated position with estimated biases applied based on the received signal.

For example, fault detector 140 is configured to obtain an estimation of an input spectrum to positioning device 160. The input spectrum includes a standard deviation of samples of an ADC of positioning device 160. AGC 122 is configured to control the gain of PGA 360 to maintain the standard deviation of the samples of the ADC constant, which supports a dynamic range of receiver 120. When all components of positioning device 160 operate without a fault, AGC 122 can control the gain of PGA 360 to maintain the standard deviation of the samples of the ADC substantially constant.

When a fault exists in one of the components of positioning device 160, the fault may cause an anomalous standard deviation among samples of the ADC. The anomalous standard deviation among samples of the ADC may be greater than a standard deviation threshold because of the fault in the one of the components of positioning device 160. Accordingly, method 200 can be practiced by fault detector 140 for detecting a potential fault in one of the components of positioning device 160 based on the standard deviation of samples of the ADC and the standard deviation threshold, similar to steps described above for fault detection based on the gain of PGA 360 and the gain threshold and equation (1). Alternatively, fault detector 140 can be configured to detect a potential fault based on the standard deviation among samples of the ADC, the gain of PGA 360, the standard deviation threshold, and the gain threshold. The latter alternative may provide a shorter reaction time of fault detection.

As another example, fault detector 140 can be configured to obtain a resulting residual of pseudorange measurements for a given estimated position with estimated biases applied based on a received signal. When positioning device 160 is configured to estimate for a given position, each measurement may include a resulting residual of pseudorange measurement because of noise and/or interference. When all components of positioning device 160 operate without a fault, the residual of pseudorange measurement is expected to increase or decrease linearly over different frequencies, i.e., different channels.

When a fault exists in one of the components of positioning device 160, the fault may cause an anomalous increase in an absolute value of the residual of pseudorange measurement. Before receiver 120 adjusts an ICB estimation to minimize the residual of pseudorange measurement, the absolute value of the anomalous residual of pseudorange measurement may be greater than a residual threshold because of the fault in the one of the components of positioning device 160. Accordingly, method 200 can be practiced by fault detector 140 for detecting a potential fault in one of the components of positioning device 160 based on the resulting residual of pseudorange measurement and the residual threshold, similar to steps described above for fault detection based on the gain of PGA 360 and the gain threshold and equation (1).

Another aspect of the disclosure is directed to a non-transitory processor-readable medium storing instructions which, when executed, cause one or more processors to perform the methods discussed above. The processor-readable medium may include volatile or non-volatile, magnetic, semiconductor, tape, optical, removable, non-removable, or other types of processor-readable medium or processor-readable storage devices. For example, the processor-readable medium may be the storage device or the memory module having the processor instructions stored thereon, as disclosed. In some embodiments, the processor-readable medium may be a disc or a flash drive having the processor instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

What is claimed is:

1. An apparatus for detecting a potential fault in a positioning device, the apparatus comprising:
   at least one memory for storing instructions; and
   at least one controller configured to execute the instructions to perform operations comprising:

obtaining information about a received signal received by the positioning device, the information comprising at least a gain control parameter;

determining whether the potential fault is detected, based on the information and a gain threshold by:
comparing the gain control parameter with the gain threshold; and
responsive to a comparison result that the gain control parameter is greater than the gain threshold, determining that the potential fault is detected; and responsive to a determination that the potential fault is detected, generating an indication that the potential fault is detected.

2. The apparatus of claim 1, wherein:
the gain control parameter comprises a current gain of a programmable gain amplifier (PGA) in a receiver of the positioning device; and
the gain threshold comprises a nominal gain of the PGA plus a delta value of gain.

3. The apparatus of claim 2, wherein the nominal gain comprises at least one of:
a predetermined value of gain stored in the at least one memory,
an initialized value of gain obtained from an initialization of the receiver, or
a low-pass filtered value of gain.

4. The apparatus of claim 1, wherein the information comprises an estimation of:
an input spectrum to the positioning device.

5. A method for detecting a potential fault in a positioning device, the method comprising:
obtaining information about a received signal received by the positioning device, the information comprising at least a gain control parameter;
determining whether the potential fault is detected, based on the information and a gain threshold by:
comparing the gain control parameter with the gain threshold; and
responsive to a comparison result that the gain control parameter is greater than the gain threshold, determining that the potential fault is detected; and
responsive to a determination that the potential fault is detected, generating an indication that the potential fault is detected.

6. The method of claim 5, wherein:
the gain control parameter comprises a current gain of a programmable gain amplifier (PGA) in a receiver of the positioning device; and
the gain threshold comprises a nominal gain of the PGA plus a delta value of gain.

7. The method of claim 6, wherein the nominal gain comprises at least one of:
a predetermined value of gain,
an initialized value of gain obtained from an initialization of the receiver, or
a low-pass filtered value of gain.

8. The method of claim 5, wherein the information comprises an estimation of an input spectrum to the positioning device.

9. A non-transitory computer-readable medium for storing instructions which, when executed, cause a controller to perform operations for detecting a potential fault in a positioning device, the operations comprising:
obtaining information about a received signal received by the positioning device, the information comprising a gain control parameter;
determining whether the potential fault is detected, based on the information and a gain threshold by:
comparing the gain control parameter with the gain threshold; and
responsive to a comparison result that the gain control parameter is greater than the gain threshold, determining that the potential fault is detected; and
responsive to a determination that the potential fault is detected, generating an indication that the potential fault is detected.

10. The non-transitory computer-readable medium of claim 9, wherein:
the gain control parameter comprises a current gain of a programmable gain amplifier (PGA) in a receiver of the positioning device; and
the gain threshold comprises a nominal gain of the PGA plus a delta value of gain.

11. The non-transitory computer-readable medium of claim 10, wherein the nominal gain comprises at least one of:
a predetermined value of gain,
an initialized value of gain obtained from an initialization of the receiver, or
a low-pass filtered value of gain.

12. The non-transitory computer-readable medium of claim 9, wherein the information comprises an estimation of an input spectrum to the positioning device.

* * * * *